(12) United States Patent
Li

(10) Patent No.: US 8,966,968 B2
(45) Date of Patent: Mar. 3, 2015

(54) EXTERNAL TIRE PRESSURE GAUGE, MOUNTING STRUCTURE ASSOCIATED THEREWITH, AND HANDLING TOOL THEREOF

(75) Inventor: Zhitao Li, Zhongshan (CN)

(73) Assignee: Steelmate Co. Ltd., Zhongshan, Guangdong (CN)

( * ) Notice: Subject to any disclaimer, the term of this patent is extended or adjusted under 35 U.S.C. 154(b) by 0 days.

(21) Appl. No.: 14/119,882

(22) PCT Filed: Jun. 26, 2012

(86) PCT No.: PCT/CN2012/077529
§ 371 (c)(1),
(2), (4) Date: Feb. 11, 2014

(87) PCT Pub. No.: WO2013/155791
PCT Pub. Date: Oct. 24, 2013

(65) Prior Publication Data
US 2014/0196531 A1  Jul. 17, 2014

(30) Foreign Application Priority Data
Apr. 18, 2012 (CN) .......................... 2012 1 0115373

(51) Int. Cl.
*B60C 23/02* (2006.01)
*B60C 23/04* (2006.01)
*B25B 27/14* (2006.01)

(52) U.S. Cl.
CPC ............. *B60C 23/0496* (2013.01); *B25B 27/14* (2013.01)
USPC ............................ 73/146.5; 73/146.3; 73/146

(58) Field of Classification Search
USPC .............................................. 73/146.5, 146.3
See application file for complete search history.

(56) References Cited

U.S. PATENT DOCUMENTS

| 5,040,562 A * | 8/1991 | Achterholt | 137/227 |
| 8,037,745 B2 * | 10/2011 | Yang | 73/146.8 |
| 2013/0213126 A1 * | 8/2013 | Li | 73/146.5 |

* cited by examiner

*Primary Examiner* — Lisa Caputo
*Assistant Examiner* — Jamel Williams
(74) *Attorney, Agent, or Firm* — Molins & Co. Pty. Ltd.

(57) ABSTRACT

An external tire pressure gauge mounting structure includes a base and a cap; the base and cap are locked together to provide an internal mounting space; the mounting structure also includes a gear, a cushion ring and a locking member; the gear is fixed on the base and has teeth; a through hole is defined in the cushion ring and teeth is provided on a sidewall of the through hole; the gear is inserted into the cushion ring, and the teeth of the cushion ring and gear mesh each other; the locking member is pressed against the cushion ring and gear; the locking member, gear and base all have their threaded holes. Also disclosed is a handling tool used for above mounting structure. The invention makes improvements upon the mounting structure of the tire pressure gauge and provides a handling tool which is easy to use. As such, mounting and dismounting of the tire pressure gauge becomes convenient.

14 Claims, 6 Drawing Sheets

EXTERNAL TIRE PRESSURE GAUGE, MOUNTING STRUCTURE ASSOCIATED THEREWITH, AND HANDLING TOOL THEREOF

FIELD OF THE INVENTION

The present invention relates to technical field of devices for detecting tire pressure of automobiles and more particularly, relates to a mounting structure used for an external tire pressure gauge, a tire pressure gauge employing the same, and also relates to an external tire pressure gauge handling tool corresponding to the mounting structure.

BACKGROUND OF THE INVENTION

The application of external tire pressure gauges has gotten wider and wider and their working principle is also well known. Presently, the major improvements made in relevant art upon the external tire pressure gauge focus on physical construction of the gauge. On one hand, it is desired that the product size is as small as possible and on the other hand, it is also desired that the mounting structure is stable and safety.

Reference is made to Chinese Patent Application No.: CN102310734-A published on Jan. 11, 2012 by Chinese Patent Office. It is disclosed in this application an external tire pressure sensing device including a base, a sensor, a circuit board used for integrated control circuit, a button battery, and a packing suite. A threaded hole is defined axially in the base for cooperating with a gas nozzle. In addition, a circular platform is formed on the top portion of the base. The device includes a sealable venting member having a supporting platform tightly engaged with the circular platform, a communication portion placed into the base screw hole from the bottom of the supporting platform to push out a gas outlet valve of the gas nozzle, and a communicating hole. The sensor is installed on the bottom surface of the circuit board so as to be electrically connected with a control circuit of the circuit board. A sensing portion located on a bottom surface of the sensor is engaged tightly with the communicating hole of the sealable venting member. The button battery is positioned on a top surface of the circuit board and electrically connected with the control circuit. An extension cylinder is provided on the bottom portion of the base; a plurality of radial screw holes is defined in a circumferential wall of the extension cylinder; and a corresponding number of screws passes through respective radial screw holes and then are locked with a circumferential wall of the gas nozzle.

In above patent application, on one hand, the internal construction of the tire pressure gauge becomes more compact by providing the sealable venting member, thereby reducing entire size of the gauge; on the other hand, the tire pressure gauge is firmly installed with the gas nozzle by tightly pressing against the circumferential wall of the gas nozzle using a screw which passes through the screw hole defined in the extension cylinder provided on the bottom portion of the base. Though this solution actually achieves its intended purpose, it is found by practice that the screw pressed forcibly against the gas nozzle has very small size and operation room between the hub and base is also limited, thus resulting in inconvenience in alignment of the screw with the screw hole and alignment of the cap portion of the screw with a screwdriver. Accordingly, manipulation of the screw is very difficult. Moreover, generally two or three screws are required to be disposed radially on the gas nozzle to generate stable and balanced mechanical construction. More screws should be operated by the user to mount or dismount the tire pressure gauges, thus resulting in inconvenience.

Furthermore, as the dimension of the tire pressure gauge gets smaller, manual assembling and disassembling of the packing suite and base gets much difficult. In addition, no design is disclosed in above disclosure for assisting in disassembling operation and accordingly, this solution is insufficient and is to be improved.

SUMMARY OF THE INVENTION

A primary objection of the invention is to provide an external tire pressure gauge mounting structure which has simple construction, stable performance, and convenience in use.

Another objection of the invention is to provide an external tire pressure gauge handling tool used for mounting and dismounting the mounting structure as described in the primary objection of the invention.

A further objection of the invention is to provide an external tire pressure gauge employing the above mounting structure.

To achieve the above object, the following technical solution is provided.

Regarding the primary objection of the invention, there is provided an external tire pressure gauge mounting structure. The mounting structure includes a base having an externally threaded sidewall and a cap having an internally threaded sidewall. The base and cap are locked together to provide an internal mounting space. In addition, the mounting structure further includes a gear, a cushion ring and a locking member. The gear is fixed on the bottom portion of the base and has a plurality of circumferentially distributed teeth. A through hole is defined in the cushion ring and a plurality of teeth is provided on the sidewall of the through hole. The outer periphery of the gear is inserted into the through hole of the cushion ring, and teeth of the cushion ring and gear mesh each other. The locking member is pressed tightly against the cushion ring and gear. The locking member, gear and base all have their threaded holes for locking with a gas nozzle valve rod.

Preferably, the gear and base are integrally formed. The locking member is a hexagon nut in the middle portion of which a threaded hole engaged with the gas nozzle valve rod is defined.

Preferably, a circular groove is defined in the base at a downward distal end of the externally threaded sidewall. A circular rubber ring is fitted into the circular groove.

Preferably, the cap is designed to surround the outer periphery of the cushion ring when the cap is locked with the base.

Preferably, a plurality of grooves is defined in the cap at a top periphery thereof for cooperating with a handling tool.

The cushion ring is provided with a protrusion, and a notch is defined in the cap for circumferentially receiving the protrusion therein. The cushion ring may be manually mounted and dismounted using the protrusion.

Regarding another objection of the invention, there is provided an external tire pressure gauge handling tool for mounting and dismounting the above external tire pressure gauge mounting structure. The handling tool includes a first manipulation member and a second manipulation member.

The first and second manipulation members are both of a disk shape and both have a front surface and a back surface.

A first clamping structure is provided on the front surface of the first manipulation member, and a first groove is defined in the back surface thereof. In addition, a plurality of protrusions is formed on the sidewall of the first groove for locking with the grooves of the mounting structure.

A second clamping structure is provided on the front surface of the second manipulation member, and a second groove is defined in the back surface thereof. In addition, a plurality of teeth is formed on the sidewall of the second groove for meshing with the gear of the mounting structure.

The second manipulation member and first manipulation member are locked together by their respective clamping structure. In addition, a receiving space is defined by the first and second manipulation members for receiving an operation member which acts on the locking member.

Considering big size of the operation member, the operation member includes a handle and an operation head. The operation head has an opening of which the shape is consistent with the outer sidewall of the locking member. The first and/or second manipulation member has a passageway for passing through of the handle.

The outer sidewall of the first manipulation member and/or second manipulation member is designed to have teeth for manual gripping the member.

Specifically, the first clamping structure includes two cylindrical walls disposed on the front surface of the first manipulation member, one of which is disposed internally while the other of which is disposed externally. A cylindrical space is defined between the two cylindrical walls. The internally disposed cylindrical wall is lower than the externally disposed cylindrical wall. The second clamping structure includes a cylindrical wall disposed on the front surface of the second manipulation member for insertion into the cylindrical space.

Preferably, the first and second manipulation members each have a hole defined therein through which a rope passes.

Regarding a further objection of the invention, there is provided an external tire pressure gauge having an external tire pressure gauge mounting structure as described above. The mounting structure provides a mounting space into which a button battery, a pressure sensor, a control circuit and an antenna are disposed. The pressure sensor is installed on the circuit board and is also secured on the base. The base has a passage extending from its through hole to the pressure sensor. The circuit board is located above the pressure sensor and incorporates therein the control circuit. The button battery is disposed above the circuit board and supplies power to the control circuit. The antenna is connected with the control circuit; and the base forms part of the antenna.

Compared with prior art, the invention has the following advantages.

Firstly, the present invention contains creative concepts. Specifically, in the external tire pressure gauge mounting structure of the present invention, the tire pressure gauge is assembled with the gas nozzle valve rod using screwing manner, though connection reliability between the tire pressure gauge and gas nozzle valve rod is somewhat reduced. When the tire pressure gauge is locked with the valve rod, the gauge and gas nozzle valve rod are clamped with each other by rotating the locking member disposed already on the valve rod. During rotation of the tire pressure gauge, potential energy is accumulated due to forward rotation of the cushion ring caused by the gear disposed on the bottom portion of the gauge. At the same time, the locking member rotates in opposing direction, such that the locking member is pressed against the cushion ring. As such, under action of friction force, potential energy causing backward rotation of the cushion ring is necessarily provided. As a result, the cushion ring tightly engages with the gear and connection between the two may be maintained due to existence of a pair of balanced forces. Due to covering action of the sidewall of the cap, no operation can be made to the cushion ring and gear both of which are covered by the cap. No operation is made to the locking member unless a tool is employed. Therefore, the external tire pressure gauge has anti-theft function at its largest extent.

Secondly, in the external tire pressure gauge handling tool of the present invention, as a number of grooves are provided on the cap, the first manipulation member of the handling tool of the invention is able to make the cap clamped. The external tire pressure gauge handling tool of the present invention further provides a second manipulation member locked with the gear of the mounting structure. Therefore, the external tire pressure gauge handling tool of the present invention is able to clamp the cap and gear disposed on the base by its two manipulation members. By rotation of the two manipulation members in opposite direction, mounting or dismounting of the cap and base is performed. As the two manipulation members have greater gripping area than the cap, mounting and dismounting of the tire pressure gauge mounting structure becomes more convenient.

Thirdly, in addition to above functions, the external tire pressure gauge handling tool of the present invention may also provide other functions. Namely, it provides a structure for clamping the above two manipulation members. In addition, it further provides an operation member for operating the locking member of the external tire pressure gauge mounting structure. Therefore, it provides convenience in mounting and dismounting the tire pressure gauge from the gas nozzle valve rod. Moreover, as the operation member, the first and second manipulation members are designed to have a combined construction, they may be stored more conveniently, missing of the members can be prevented, and thus they have more reasonable design.

DETAILED DESCRIPTION OF THE INVENTION

Various embodiments of the invention will be described below in further detail with reference to the accompanying drawings.

Figure 1:
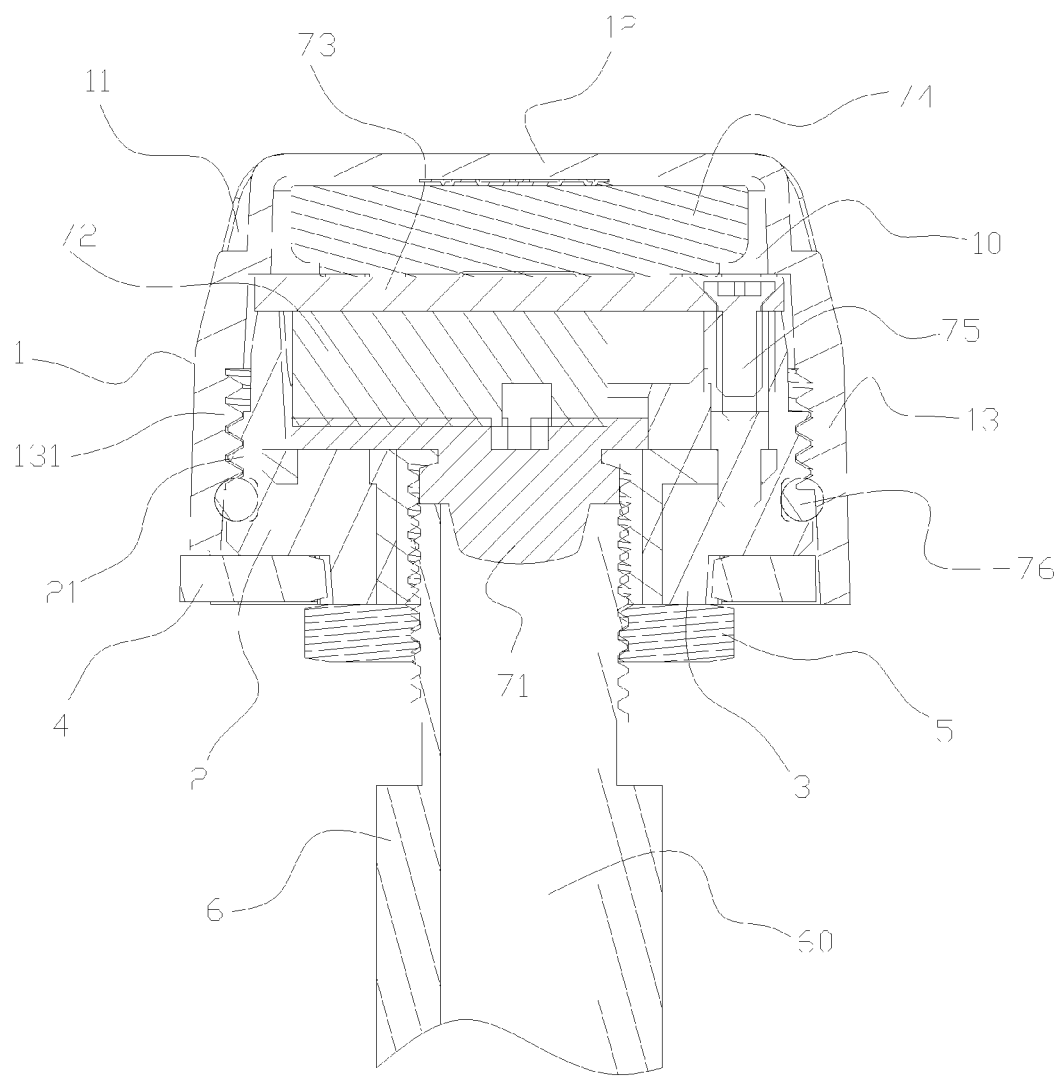
FIG. 1 shows a cross-sectional view of an external tire pressure gauge in assembled state according to an embodiment of the invention.

Please refer to FIG. 1. The external tire pressure gauge of the invention is installed on a valve rod 6 of a gas nozzle of an automobile tire. A valve gate on the gas nozzle valve rod 6 is lifted by an ejection pin 71 to be opened. By this way, pressure inside the tire is transferred to a pressure sensor 72 inside the tire pressure gauge such that the pressure inside the tire can be measured by the sensor 72. Signals representing the pressure value are transmitted to space by related control circuit (not shown) and an antenna 75, so that they will be received and processed by a monitor unit (not shown) inside the automobile, thus finishing detection of the tire pressure of a car.

Reference is also made to FIG. 1. The external tire pressure gauge provides a mounting structure having an internal mounting space 10, a pressure sensor 72, a circuit board 73, a control circuit (not shown), an antenna 75 and a button battery 74.

The pressure sensor 72 is installed on the bottom portion of the mounting space 10. A passage is defined in the mounting structure for passing the tire pressure into the pressure sensor 72. The pressure sensor 72 is connected with the circuit board 73 at the top portion thereof. The circuit board 73 is also placed on the top portion of the pressure sensor 72. A control circuit is integrated onto the circuit board 73 for controlling pressure detection of the pressure sensor 72; generating signals indicating said detected pressure, and transmitting them to space through the antenna 75. The circuit board 73 is held on a base 2 of the mounting structure using a screw 75. The base 2 is a metal component and is electrically coupled to the screw 75 by lines on a surface of the circuit board 73. The screw 75 in turn, is connected to the base 2. Furthermore, the base 2 is also connected with the gas nozzle valve rod 6, thus forming the antenna 75. The base 2 is part of the antenna 75. The button battery 74 is installed on the top portion of the circuit board 73 for supplying power to the pressure sensor 72, control circuit and antenna 75.

Figure 2:
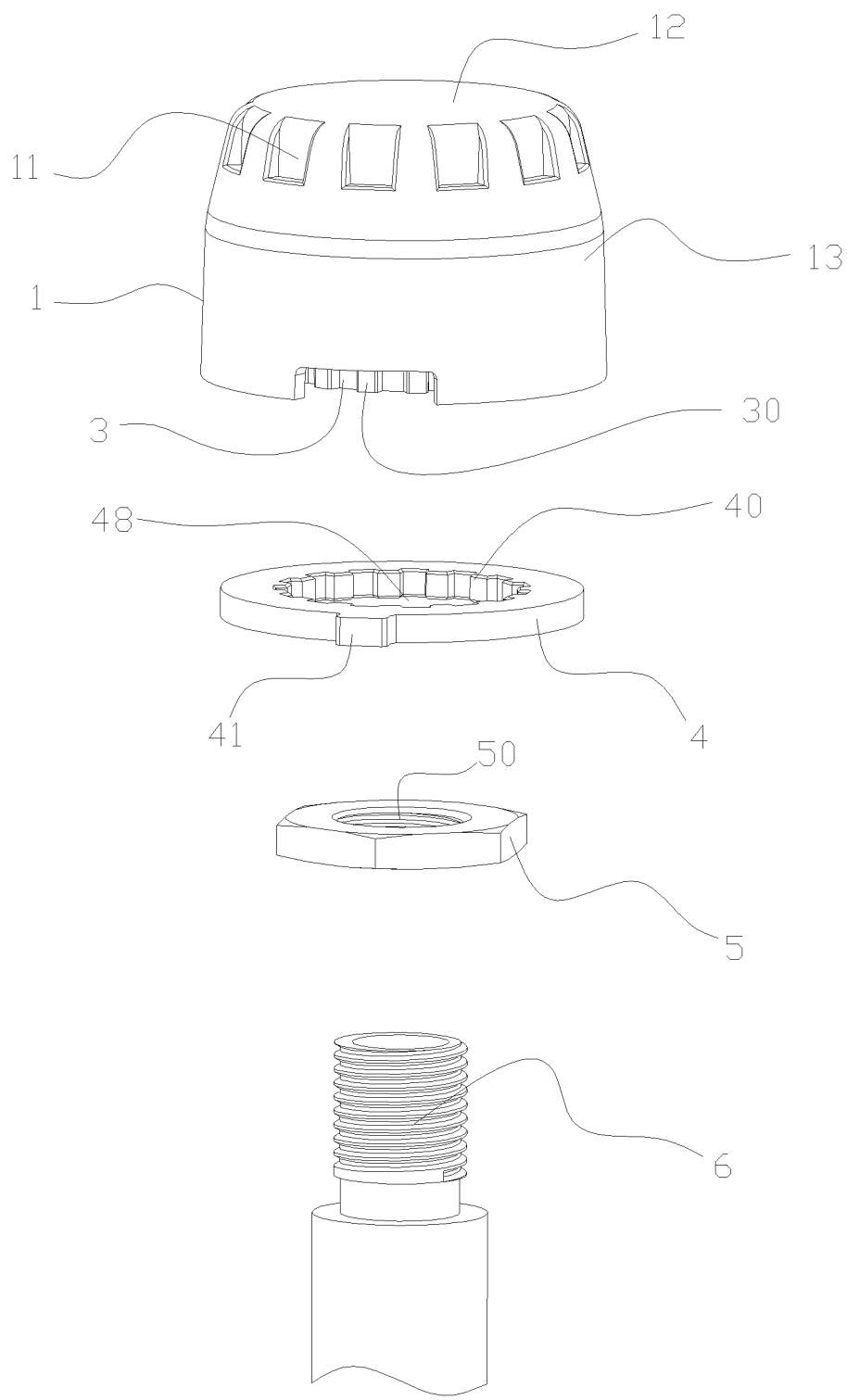
FIG. 2 shows an exploded perspective view of an external tire pressure gauge according to an embodiment of the invention.
Figure 3:
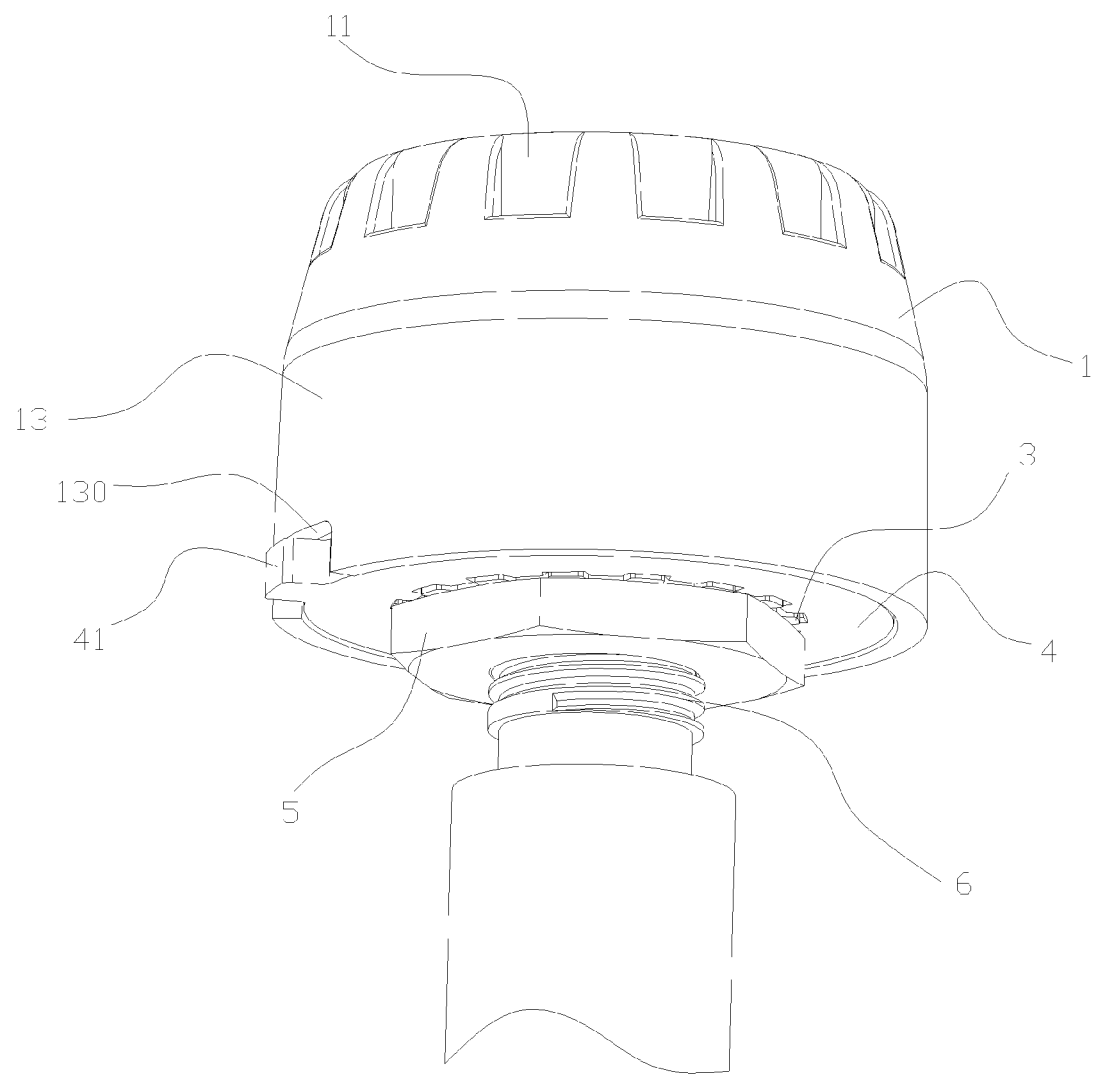
FIG. 3 shows a perspective view of an external tire pressure gauge according to an embodiment of the invention.
Figure 4:
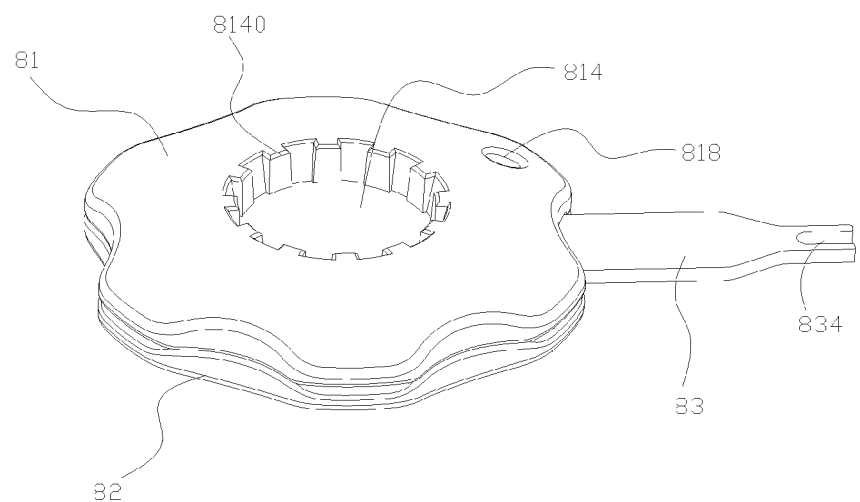
FIG. 4 shows a perspective view of a handling tool used for an external tire pressure gauge according to an embodiment of the invention, illustrating an operation member placed in the handling tool.
Figure 5:
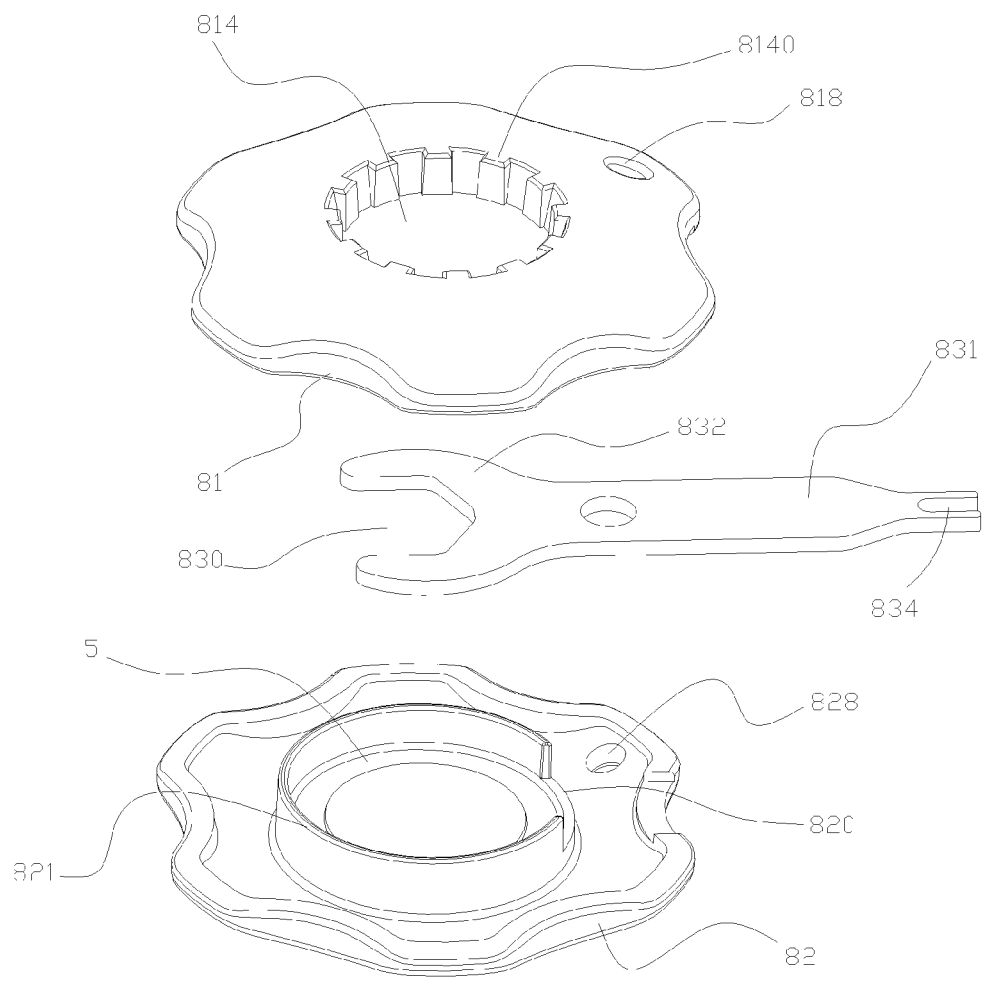
FIG. 5 shows a perspective view of a handling tool used for an external tire pressure gauge according to an embodiment of the invention, illustrating a first and second manipulation members and details of the operation member.
Figure 6:
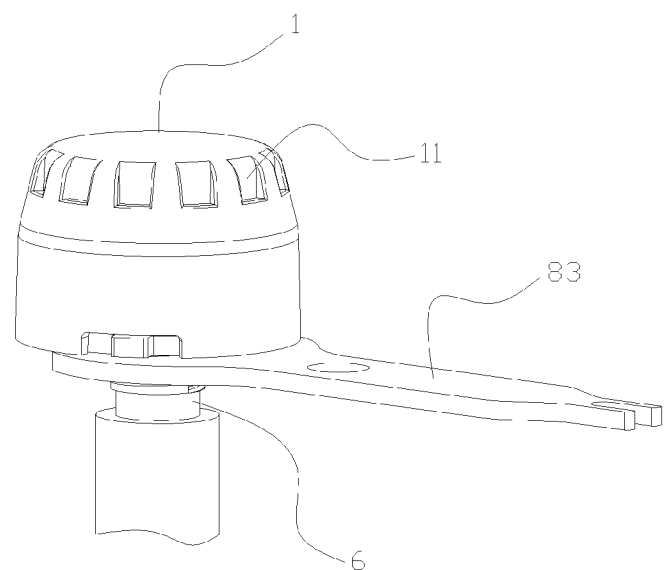
FIG. 6 denotes interactive relationship between the operation member of the handling tool of the external tire pressure gauge of the invention of FIG. 5 and tire pressure gauge.
Figure 7:
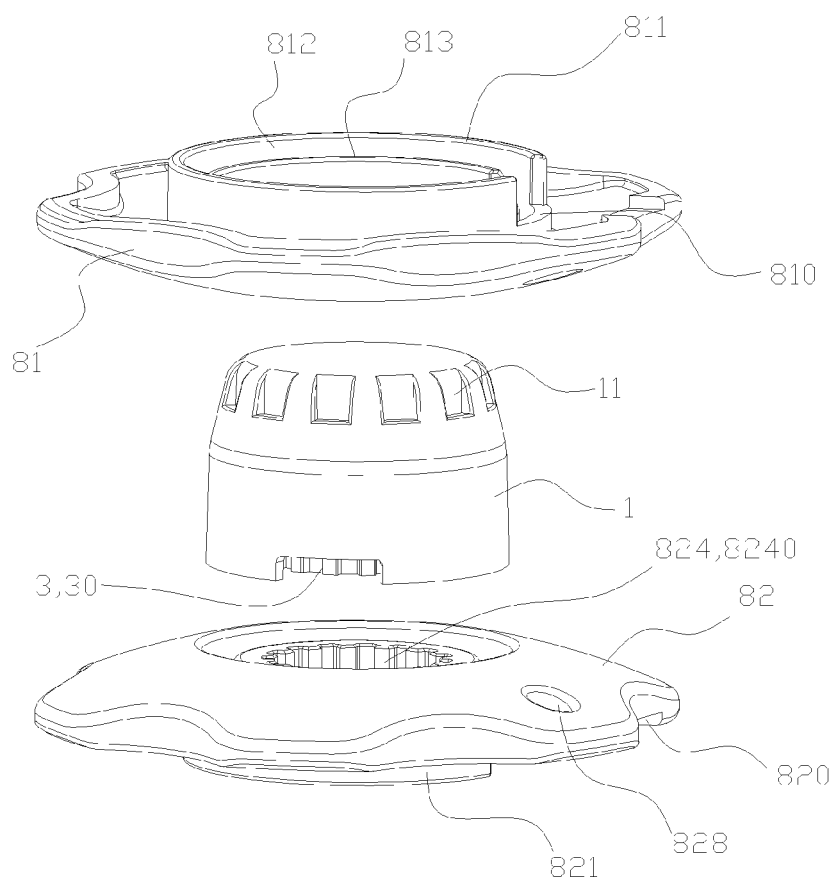
FIG. 7 shows operating state of the handling tool of the external tire pressure gauge of the invention of FIG. 5, also illustrating the first and second manipulation members disposed back to back, and also showing the interactive relationship between the members and the external tire pressure gauge.
Figure 8:
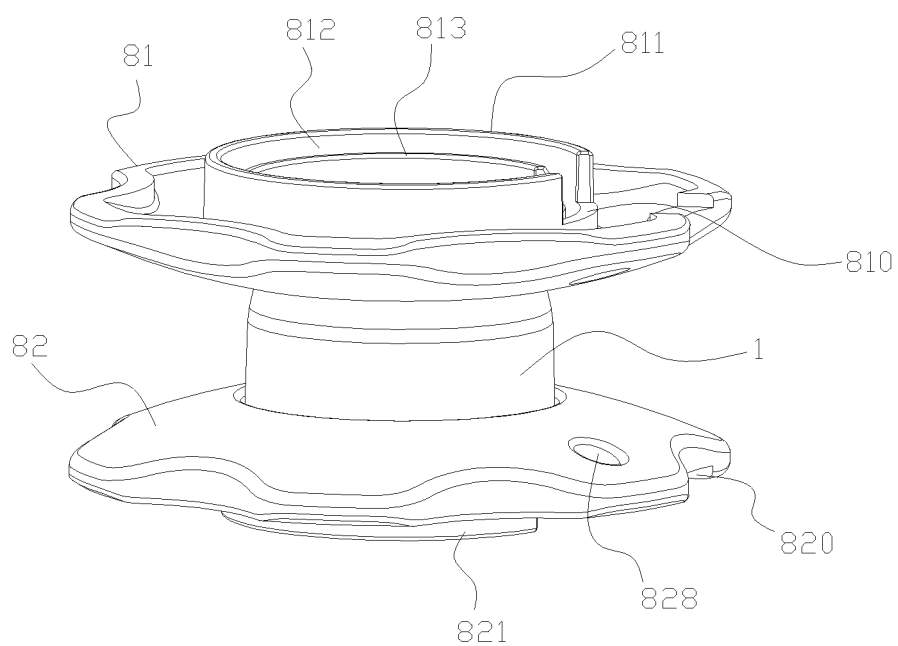
FIG. 8 is based on FIG. 7 and shows status after the first and second manipulation members are assembled together with a cap and gear on the bottom portion of the base respectively.

Referring to FIGS. 1-3, the mounting structure of the external tire pressure gauge of the invention includes a cap 1, a base 2 a gear 3, a cushion ring 4 and a locking member 5.

The cap 1 is of an inverted barrel shape and includes a disk 12 and a sidewall 13 extending downwardly from the circumference of the disk 12. A plurality of grooves 11 is defined in the cap 1 at a top periphery thereof and close to a transition region between the sidewall 13 and disk 12. The grooves 11 surround the top periphery. The grooves 11 are evenly and circumferentially disposed. The cap 1 is able to rotate by operation of these grooves 11. The inner side of the sidewall 13 of the cap 1 is internally threaded so as to form an internally threaded sidewall 131 which engages an externally threaded sidewall 21 of the base 2.

The base 2 is integrally formed with the gear 3 and is of substantially a cylindrical shape. A slot (not labeled) is defined in the top portion of the base 2 for receiving therein the pressure sensor 72. In addition, the base 2 has an externally threaded sidewall 21 corresponding to the internally threaded sidewall 131 of the cap 1. By engagement and locking between the two threaded sidewalls 21 and 131, the base 2 and cap 1 are connected with each other. As such, the mounting space 10 is defined cooperatively by the cap 1 and base 2 for accommodating the sensor 72, control circuit, circuit board 73, button battery 74 and the antenna 75. A circular groove (not labeled) is defined in the base 2 at a downward distal end of the external thread. A circular rubber ring 76 is fitted into the circular groove. Accordingly, when the cap 1 is secured to the base 2, the circular rubber ring 76 will be sandwiched between the parts such that connection therebetween will be more reliable. In addition, the rubber ring 76 also enhances air tightness of the mounting space 10.

Between the integrally formed base 2 and gear 3, a threaded hole (not labeled) is axially defined. The threaded hole passes through the gear 3 and comes into the base 2. Therefore, in case that the gear 3 and base 2 are separate components and they are for example welded or locked together, it can be the fact that both of the gear 3 and base 2 have their respective threaded holes defined therein. At the distal end of the threaded hole is a component of the base 2 for providing a mounting location for the ejection pin 71 and sensor 72. The threaded hole passes across the entire base 2 and acts as a passage through which gas travels and applies to the sensor 72. For the tire pressure gauge, after engagement between the threaded hole collectively defined in the gear 3 and base 2 and gas nozzle valve rod 6, the ejection pin 71 inserted into the passage lifts the gas nozzle valve gate such that the tire pressure imposed on the ejection pin 71 is transferred to the sensor 72 so as to perform pressure detection.

A circular sheet having a plurality of circumferentially distributed teeth 30 is formed on the gear 3 at a location close to a smooth bottom surface of the base 2. The gear 3 and base 2 have the same threaded hole as the two parts are integrally formed.

The cushion ring 4 is of an annular sheet having an axially defined through hole 48. A plurality of teeth 40 is formed on the sidewall of the through hole 48 for engaging teeth 30 of the gear 3. The cushion ring 4 is also disposed on the bottom portion of the base 2. The gear 3 is inserted into the through hole 48 and teeth 30 and 40 engage with each other. At the same time, the sidewall 13 of the cap 1 is designed to have an axial length such that the sidewall 13 will surround the periphery of the cushion ring 4 completely when the cap 1 and base 2 are locked together. To manually dismount the cushion ring 4, a notch 130 is defined in the sidewall 13 of the cap 1, and a protrusion 41 is formed on the periphery of the cushion ring 4. The circumferential width of the protrusion 41 is smaller than that of the notch 130 allowing slight circumferential adjustment of the cushion ring 4. This facilitates dismounting process by gripping the protrusion 41. Moreover, this also helps to slightly adjust engagement between the cushion ring 4 and gear 3.

Preferably, the locking member 5 is a hexagon nut with a through hole 50 defined in its middle location for locking with the gas nozzle valve rod 6. By adjusting location of the through hole 50 on the valve rod 6, one end surface of the nut will be tightly pressed against the gear 3 and cushion ring 4 which are disposed on the bottom portion of the base 2 and are mounted on the valve rod 6.

In assembling of the external tire pressure gauge of the invention, the internal components such as the pressure sensor 72, circuit board 73, control circuit, antenna 75 and button battery 74 are firstly mounted on the base 2. After that, the circular rubber ring 76 is fitted into the circular groove of the base 2. Next, the cap 1 and base 2 are secured with each other. This way, a stand-alone component having function of a tire pressure gauge is formed. The cushion ring 4 and locking member 5 may be used when the tire pressure gauge is assembled with the gas nozzle valve rod 6.

In process of assembling the external tire pressure gauge of the invention with the gas nozzle valve rod 6, firstly the locking member 5 is locked with the valve rod 6 by screwing and the locking member 5 is lowered to the bottom portion of the valve rod 6. Then, the gear 3 is inserted into the cushion ring 4 such that they engage with each other. Care should be taken to ensure that the protrusion 41 of the cushion ring 4 will face the notch (if any) of the cap 1. The gas nozzle valve rod 6 is inserted into the through hole of the stand-alone component having function of a tire pressure gauge. Finally, along the gas nozzle valve rod 6, the stand-alone component having function of a tire pressure gauge is rotated towards the locking member 5 such that the component will be tightly secured with the member, and the locking member 5 is also rotated towards the stand-alone component such that the locking member 5 is also tightly secured with the component. In this way, the stand-alone component and gas nozzle valve rod 6 are secured with each other. Meanwhile, the cushion ring 4 is also tightly engaged with the gear 3 under force of two directions. As such, stable connection between the external tire pressure gauge and gas nozzle valve rod 6 is achieved.

To realize reliable mounting of the external tire pressure gauge and its mounting structure of the invention, and to also realize dismounting of them when necessary, the invention discloses herewith an external tire pressure gauge handling tool.

With reference to FIGS. 4-8, the external tire pressure gauge handling tool of the invention includes a first manipulation member 81, a second manipulation member 82, and an operation member 83. Both of the first and second manipulation members 81 and 82 are of a disk shape and each have a front surface and a back surface.

The front surface of the first manipulation member 81 is provided with a first clamping structure which includes two axially disposed cylindrical walls 811 and 813. The two cylindrical walls 811 and 813 are formed on the front surface of the first manipulation member 81, have different diameters and one is surrounded by the other one. As a result, a cylindrical space 812 is defined between the two cylindrical walls 811 and 813. The axial height of the inner cylindrical wall 813 is smaller than that of the outer cylindrical wall 811. A circular groove 814 is defined in the back surface of the first manipulation member 81. A plurality of protrusions 8140 is formed on the sidewall of the first groove 814. The protrusions 8140 are clamped into the grooves 11 of the mounting structure. In addition, the number and shape of the protrusions 8140 are the same as those of the grooves 11 of the cap 1 so that they will be tightly locked together.

The front surface of the second manipulation member 82 is provided with a second clamping structure which includes a cylindrical wall 821 disposed on the front surface of the second manipulation member 82. The diameter of the cylindrical wall 821 is same as that of the circular cylindrical space 812 of the first manipulation member 81 so that the cylindrical wall 821 is able to be inserted into the circular cylindrical space 812. A second groove 824 is defined in the back surface of the second manipulation member 82. Further, the sidewall of the second groove 824 is provided with plural teeth 8240 meshed with the gear 3 of the mounting structure. By this manner, the second manipulation member 82 can engage the gear 3.

The second manipulation member 82 and first manipulation member 81 are clamped together by insertion of the cylindrical wall 821 on the front surface of the second manipulation member 82 into the circular cylindrical space 812 of the first manipulation member 81. After assembling, the first manipulation member 81, inner cylindrical wall 813 thereof, and front surface of the second manipulation member 82 collectively define a receiving space (not labeled) for receiving the operation member 83. Considering big size of the operation member 83, corresponding to the size of the operation member 83, the two cylindrical walls 811 and 813 of the first manipulation member 81 and cylindrical wall 821 of the second manipulation member 82 may individually be provided with notches so as to form passageway 810 and 820, thus allowing partially passing of the operation member 83.

Specifically, remember that the aforementioned locking member 5 is a hexagon nut. The operation member 83 is a spanner including an operation head 832 and a handle 831 integrally formed with the operation head 832. The operation head 832 has an opening 830 of which the shape is consistent with the outer sidewall of the locking member 5. When in use, rotation of the locking member 5 is controlled by clamping the hexagon nut using the operation member 83. One end of the operation member 83 far away from the operation head 832 is further provided with a holding slot 834 for holding and manipulating the gas nozzle.

To facilitate gripping of the first manipulation member 81 and second manipulation member 82, the outer sidewall of the first manipulation member 81 and/or second manipulation member 82 is designed to have teeth (i.e., circumferential wave shape).

To conveniently stow handling tool of the invention, holes 818 and 828 are respectively defined in the first manipulation member 81 and second manipulation member 82.

The operation of the external tire pressure gauge of the present invention using the handling tool will be described in conjunction with the mounting structure of the invention.

During assembling process, the first groove 814 (using its protrusions 8140) on the back surface of the first manipulation member 81 is clamped with the top periphery of the cap 1 (using its grooves 11). The second groove 824 (using its teeth 8240) on the back surface of the second manipulation member 82 is meshed with the gear 3 (using its teeth 30). Next, the cap 1 is aligned with the base 2. The first manipulation member 81 is forwardly rotated and at the same time, the second manipulation member 82 is rotated backwardly until the cap 1 and base 2 are locked together. As such, mounting and dismounting of the cap 1 and base 2 is realized by the handling tool. When time comes to dismounting the cap 1 from base 2, the same principle applies. That is, rotation in opposing direction will let the cap 1 be removed from base 2.

When assembling with the gas nozzle valve rod 6, the stand-alone component having function of a tire pressure gauge may be rotated by the first manipulation member 81 clamped with the cap 1 such that the stand-alone component will be locked towards the bottom of the valve rod 6. At this time, the operation head 832 of the operation member 83 may hold the locking member 5 and rotate the same in opposing direction, such that the locking member 5 is locked, thus finishing whole mounting process. When disassembling, the same principle is applied. That is, the locking member 5 is released by the operation member 83 at first and then, the stand-alone component having function of a tire pressure gauge is also released by the first manipulation member 81.

In a summary, the present invention has made improvements upon the mounting structure of the tire pressure gauge and, also provides a handling tool for conveniently mounting and dismounting the tire pressure gauge.

Though various embodiments of the invention have been illustrated above, a person of ordinary skill in the art will understand that, variations and improvements made upon the illustrative embodiments fall within the scope of the invention, and the scope of the invention is only limited by the accompanying claims and their equivalents.

The invention claimed is:

1. An external tire pressure gauge mounting structure comprising a base having an externally threaded sidewall and a cap having an internally threaded sidewall; the base and cap are locked together to provide an internal mounting space; the mounting structure further comprises a gear, a cushion ring and a locking member; the gear is fixed on a bottom portion of the base and has a plurality of circumferentially distributed teeth; a through hole is defined in the cushion ring and a plurality of teeth is provided on a sidewall of the through hole; an outer periphery of the gear is inserted into the through hole of the cushion ring, and the teeth of the cushion ring and gear mesh each other; the locking member is pressed tightly against the cushion ring and gear; the locking member, gear and base all have their threaded holes for locking with a gas nozzle valve rod.

2. The external tire pressure gauge mounting structure according to claim 1, wherein the gear and base are integrally formed.

3. The external tire pressure gauge mounting structure according to claim 1, wherein the locking member is a hexagon nut in the middle portion of which a threaded hole engaged with the gas nozzle valve rod is defined.

4. The external tire pressure gauge mounting structure according to claim 1, wherein a circular groove is defined in the base at a downward distal end of the externally threaded sidewall; and a circular rubber ring is fitted into the circular groove.

5. The external tire pressure gauge mounting structure according to any one of claims 1, wherein the cap is designed to surround the outer periphery of the cushion ring when the cap is locked with the base.

6. The external tire pressure gauge mounting structure according to any one of claims 1, wherein a plurality of grooves is defined in the cap at a top periphery thereof.

7. The external tire pressure gauge mounting structure according to any one of claims 1, wherein the cushion ring is provided with a protrusion and a notch is defined in the cap for circumferentially receiving the protrusion therein.

8. An external tire pressure gauge handling tool for mounting and dismounting the external tire pressure gauge mounting structure as defined in claim 6, the handling tool comprising a first manipulation member and a second manipulation member; wherein
   the first and second manipulation members are both of a disk shape and both have a front surface and a back surface
   a first clamping structure is provided on the front surface of the first manipulation member, and a first groove is defined in the back surface thereof; a plurality of protrusions is formed on the sidewall of the first groove for locking with the grooves of the mounting structure;
   a second clamping structure is provided on the front surface of the second manipulation member, and a second groove is defined in the back surface thereof; a plurality of teeth is formed on the sidewall of the second groove for meshing with the gear of the mounting structure;
   the second manipulation member and first manipulation member are locked together by their respective clamping structure; a receiving space is defined by the first and second manipulation members for receiving an operation member which acts on the locking member.

9. The external tire pressure gauge handling tool according to claim 8, wherein the operation member comprises a handle and an operation head; the operation head has an opening of which the shape is consistent with the outer sidewall of the locking member; the first and/or second manipulation member has a passageway for passing through of the handle.

10. The external tire pressure gauge handling tool according to claim 8, wherein the outer sidewall of the first manipulation member and/or second manipulation member is designed to have teeth.

11. The external tire pressure gauge handling tool according to claim 8, wherein the first clamping structure comprises two cylindrical walls disposed on the front surface of the first manipulation member, one of which is disposed internally while the other of which is disposed externally; a cylindrical space is defined between the two cylindrical walls; the internally disposed cylindrical wall is lower than the externally disposed cylindrical wall; the second clamping structure comprises a cylindrical wall disposed on the front surface of the second manipulation member for insertion into the cylindrical space.

12. The external tire pressure gauge handling tool according to claim 8, wherein the first and second manipulation members each have a hole defined therein through which a rope passes.

13. An external tire pressure gauge comprising an external tire pressure gauge mounting structure as defined in any one of claims 1.

14. The external tire pressure gauge according to claim 13, wherein the mounting structure provides a mounting space into which a button battery, a pressure sensor, a control circuit and an antenna are disposed; the pressure sensor is installed on the circuit board and is also secured on the base; the base has a passage extending from its through hole to the pressure sensor; the circuit board is located above the pressure sensor and incorporates therein the control circuit; the button battery is disposed above the circuit board and supplies power to the control circuit; the antenna is connected with the control circuit; and the base forms part of the antenna.

* * * * *